United States Patent
Vassilovski et al.

(10) Patent No.: US 6,845,092 B2
(45) Date of Patent: Jan. 18, 2005

(54) SYSTEM AND METHOD FOR MOBILE STATION AUTHENTICATION USING SESSION INITIATION PROTOCOL (SIP)

(75) Inventors: Dan Vassilovski, Del Mar, CA (US); Maria I. Marshall, Oceanside, CA (US)

(73) Assignee: Qualcomm Incorporated, San Diego, CA (US)

(*) Notice: Subject to any disclaimer, the term of this patent is extended or adjusted under 35 U.S.C. 154(b) by 77 days.

(21) Appl. No.: 09/905,303

(22) Filed: Jul. 13, 2001

(65) Prior Publication Data

US 2003/0012159 A1 Jan. 16, 2003

(51) Int. Cl.[7] .............................................. H04L 12/66
(52) U.S. Cl. ....................... 370/342; 370/356; 370/401; 370/466
(58) Field of Search ................................ 370/335, 342, 370/356, 401, 402, 410, 465, 466, 467

(56) References Cited

U.S. PATENT DOCUMENTS

| | | | | |
|---|---|---|---|---|
| 5,845,211 A | * | 12/1998 | Roach, Jr. .................... | 455/436 |
| 6,138,007 A | | 10/2000 | Bharatia | |
| 6,178,337 B1 | | 1/2001 | Spartz et al. | |
| 6,338,140 B1 | * | 1/2002 | Owens et al. ................ | 713/168 |
| 6,366,961 B1 | * | 4/2002 | Subbiah et al. .............. | 709/238 |
| 6,393,014 B1 | * | 5/2002 | Daly et al. ................... | 370/352 |
| 6,427,071 B1 | * | 7/2002 | Adams et al. ............... | 455/403 |
| 6,434,139 B1 | * | 8/2002 | Liu et al. ..................... | 370/352 |
| 6,434,140 B1 | | 8/2002 | Barany et al. | |
| 6,438,114 B1 | * | 8/2002 | Womack et al. ............ | 370/329 |
| 6,463,055 B1 | * | 10/2002 | Lupien et al. ............... | 370/353 |
| 6,477,150 B1 | * | 11/2002 | Maggenti et al. ........... | 370/312 |
| 6,490,451 B1 | * | 12/2002 | Denman et al. ............. | 455/436 |
| 6,515,985 B2 | * | 2/2003 | Shmulevich et al. ........ | 370/356 |
| 6,529,729 B1 | * | 3/2003 | Nodoushani et al. ........ | 455/419 |
| 6,622,016 B1 | * | 9/2003 | Sladek et al. ........... | 379/201.01 |

* cited by examiner

*Primary Examiner*—Min Jung
(74) *Attorney, Agent, or Firm*—Philip R. Wadsworth; Sandip (Micky) S. Minitas; Abdollah Katbab

(57) ABSTRACT

A system and method for transmitting CDMA call set-up parameters including authentication parameters through an IP-based infrastructure to an authenticating entity. A base station encapsulates, in SIP messages, CDMA data from wireless communication devices, with the headers of the messages indicating the presence of the CDMA-specific data in the message body. The SIP messages are routed through the infrastructure to an IS41 gateway, which strips the CDMA-specific data from the SIP messages and sends the necessary data to the authenticating entity for setting up a CDMA call.

42 Claims, 2 Drawing Sheets

SYSTEM AND METHOD FOR MOBILE STATION AUTHENTICATION USING SESSION INITIATION PROTOCOL (SIP)

I. FIELD OF THE INVENTION

The present invention relates generally to enabling a wireless telephone that is not required or generally configured to support voice over Internet Protocols (VOIP) to nonetheless authenticate itself using wireless telephone infrastructure that uses IP structures or architectures, with IP-based communication between the wireless telephone infrastructure and any VOIP-based infrastructure being supported.

II. BACKGROUND OF THE INVENTION

Wireless telephones, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A, IS-95B, and IS-2000. The system infrastructure, which can include base stations (BTS), base station controllers (BSC), and other components, connects the wireless telephone to another communication device, such as a through land line or another wireless communication system.

In the case of CDMA, voice data is sent over the air in packets that are collected by the infrastructure and assembled into a voice stream, transparently to the speakers who are talking to each other. As might be expected, the over-the-air protocol is tailored to optimize wireless communication. For instance, to maximize over-the-air capacity, the over-the-air protocol contains a minimum of signalling information, and the size of a voice data packet is relatively small.

With the growth of the Internet, computer-to-computer communication using Internet Protocols (IP) has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called voice over IP (VOIP) has been introduced.

To support VOIP, a communication device must have, among other requirements, IP capability, i.e., the device must itself be able to communicate using IP, and it must have an IP address.

The disclosed embodiments critically observe, however, that requiring a wireless telephone to use VOIP diminishes over-the-air capacity because VOIP is not necessarily designed to maximize such capacity. Instead, VOIP accounts for design considerations that are not necessarily related to wireless telephony. As an example, the data packet size of VOIP is relatively large, compared to the packet size used throughout the wireless communication industry such as in wireless telephones using over-the-air protocols such as IS-95. Indeed, a typical packet size in the IS-95 protocol is less than the size of a single packet header employed in a typical IP. Moreover, configuring a wireless telephone to communicate using both IP and over-the-air protocols complicates telephone design, adversely strains available resources (e.g., power, computing cycles, coding, and so on), and increases costs.

Nonetheless, the disclosed embodiments understand that it would be desirable to enable wireless telephone communication using an infrastructure that transmits data in accordance with IP principles. The disclosed embodiments further understand, however, that in the case of CDMA, CDMA parameters are required to be transmitted through the IP infrastructure so that authentication, in addition to VOIP call setup procedures, can be undertaken. Such authentication can require authentication with non-IP entities that instead of IP use, for example, IS41 messages over an SS7 link. With the above considerations in mind, the disclosed embodiments provide the solutions disclosed below.

SUMMARY OF THE INVENTION

A voice over Internet (VOIP) system includes a CDMA access point (CAP) in communication with mobile stations (MS) using an over-the-air (OTA) protocol that is different from Internet protocol (IP). The CAP includes a logic component which transforms information in OTA protocol from the MS to IP protocol, and which also encapsulates CDMA authentication parameters in IP. The information in IP is sent toward an IS41 gateway, which strips the authentication parameters and sends them to an authenticating entity in a format other than IP, such as IS41 protocol.

In one aspect, the CAP generates a session initiation protocol (SIP) message that contains a header indicating the presence of the authentication parameters in the message. The CAP can be a base station (BTS), and the authenticating entity can be part of a network such as a wireless CDMA network. In any case, the header of the SIP message can include a CDMA function that is defined as a service that can be invited to SIP sessions, with the service including an SIP agent.

In another non-limiting aspect, a method for communicating information in IP to a wireless device that does not support IP includes encapsulating CDMA call set-up parameters in an SIP message, and indicating in the SIP message that the CDMA call set-up parameters are present. The SIP message is transmitted through an IP infrastructure. As set forth further below, the CDMA call set-up parameters are stripped from the SEP message for use thereof in establishing communication between a mobile station (MS) and a called party.

In still another non-limiting aspect, a communication system includes an IP-based infrastructure transmitting information relating to wireless voice transmissions. At least some of the information includes CDMA authentication data encapsulated in IP. An IS41 gateway receives the information and transmits the authentication data using a protocol different from IP.

In yet another non-limiting aspect, a session initiation protocol (SIP) message structure includes a message body containing CDMA authentication parameters, and a header defining a media type corresponding to the CDMA authentication parameters.

The details of the disclosed embodiments, both as to structure and operation, can best be understood in reference to the accompanying drawings, in which like reference numerals refer to like parts, and in which:

DETAILED DESCRIPTION

Figure 1:
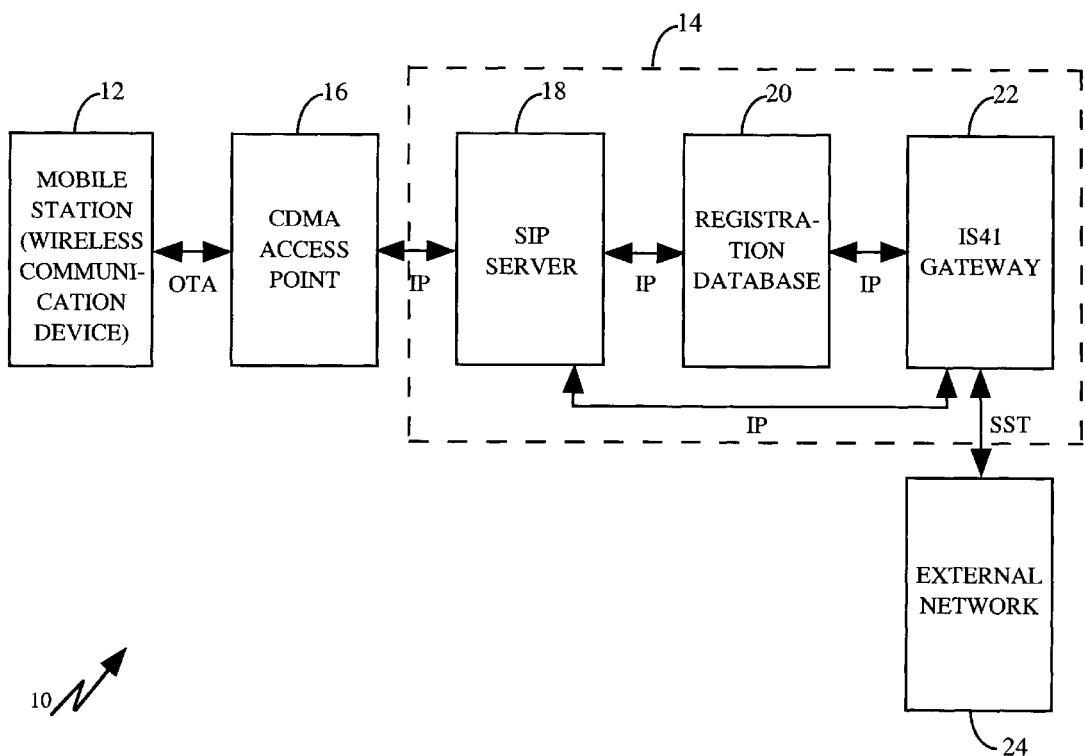
FIG. 1 is a block diagram of a wireless communication system.

Referring initially to FIG. 1, a system is shown, generally designated 10, for effecting communication between a mobile station (MS) 12, i.e., a wireless communication device that does not support voice over Internet Protocols (VOIP), and a telephony infrastructure 14 that supports IP. By "does not support VOIP" or "does not support IP" is meant that the MS 12 either has no IP or VOIP capability, or that it has such capability but for improved performance uses a standard over the air (OTA) protocol such as a spread spectrum scheme like CDMA (which includes WCDMA, TD-SCDMA, cdma2000, and other spread spectrum protocols) or other wireless protocol such as but not limited to TDMA, UMTS, etc. to communicate with the infrastructure 14. In one non-limiting embodiment the MS 12 is a mobile telephone made by Kyocera, Samsung, or other manufacturer that uses Code Division Multiple Access (CDMA) principles and CDMA over-the-air (OTA) communication air interface protocols such as defined in but not limited to IS-95A, IS-95B, UCDMA, IS-2000, and others to communicate with the infrastructure 14.

For instance, the wireless communication systems to which the present invention can apply, in amplification to those noted above, include Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/ Universal Mobile Telecommunications Systems (IMT-2000/ UM), standards covering what are referred to as wideband The disclosed embodiment apply to any MS 12. In general, the disclosed embodiments may include but are not limited to a wireless handset or telephone, a cellular phone, a data transciever, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the disclosed embodiments apply to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems. CDMA (WCDMA), cdma2000 (such as cdma2000 1× or 3× standards, for example) or TD-SCDMA.

As shown in FIG. 1, the MS 12 communicates, using one or more of the above-mentioned systems, with at least one CDMA Access Point (CAP) 16. The CAP 16 preferably is a base station (BTS), but it can also be implemented by base station controller (BSC), mobile switching center (MSC), gateway to a satellite system, or other infrastructure component. In any case, the CAP 16 not only supports the necessary protocols and systems to communicate with the MS 12, but also supports IP and attendant protocols or stack of IP protocols, and accordingly communicates with a Session Initiation Protocol (SIP) server 18 using IP. The SIP server 18 can be a VOIP SIP server configured to function in accordance with VOIP principles known in the art for the communication of IP packets, with the understanding that the IP messages of the present invention contain CDMA-related data in accordance with the disclosure below.

In turn, the SIP server 18 communicates with a registration database 20 that lists mobile stations that are registered with the infrastructure 14. Both the SIP server 18 and the registration database 20 communicate with an IS41 gateway 22. As intended by the disclosed embodiments and as more fully set forth below, the IS41 gateway 22 extracts the CDMA parameters from the IP packets and reformats IP as necessary to IS41 protocol that uses an SS7 carrier. Other protocols such as ISUP and indeed IP can be used. The reformatted data is then sent to an external network 24, e.g., another wireless communication network, a computer network, a satellite communication network, a public switch telephone network (PSTN), etc.

Figure 2:
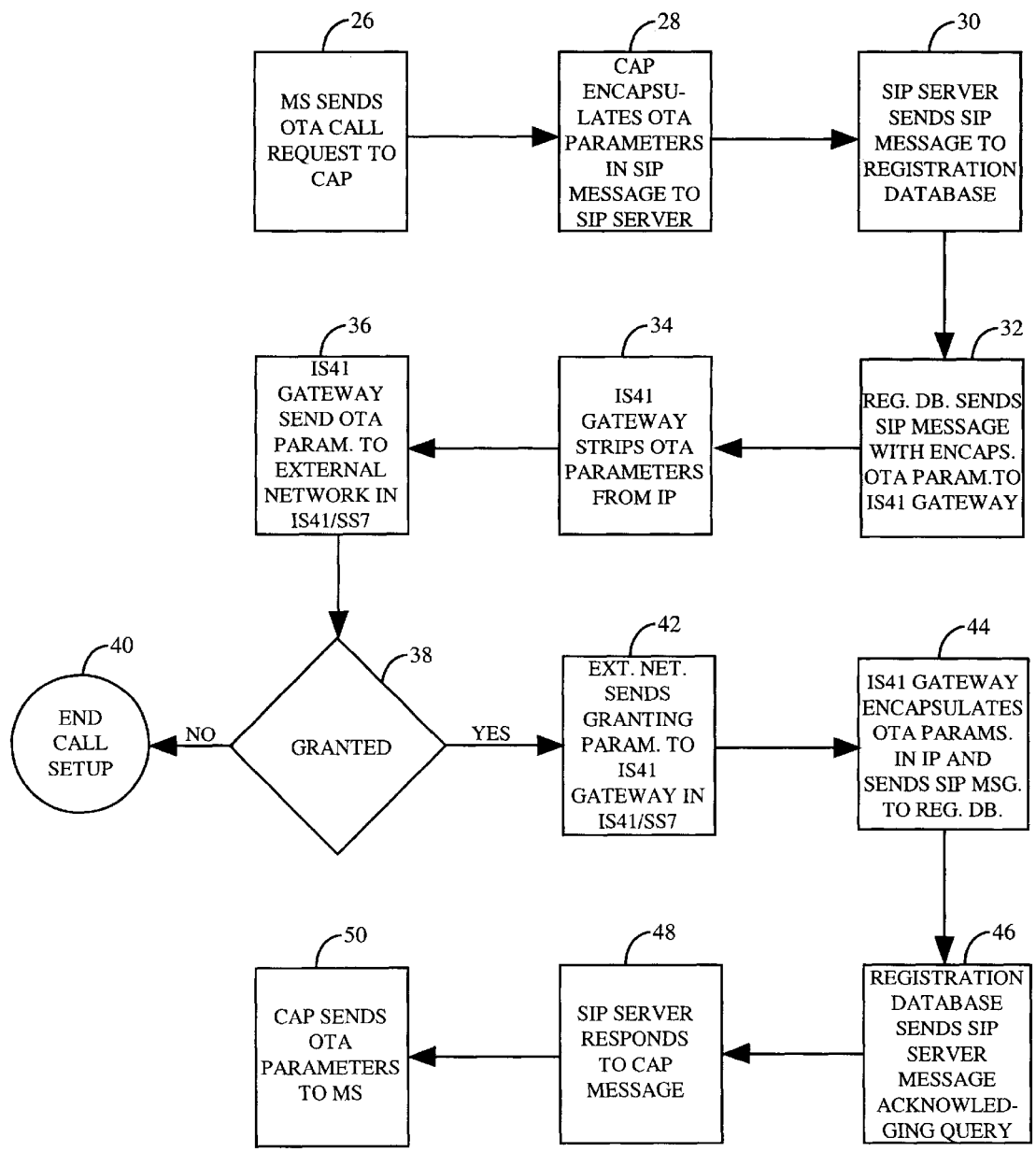
FIG. 2 is a flow chart of the logic for authenticating a mobile station using SIP-to-IS41 communication scheme.

With the above architectural overview in mind, attention is now directed to FIG. 2. It is to be understood that the present logic is executed on the architecture shown in FIG. 1 in accordance with the flow charts discussed below. The flow charts herein illustrate the structure of the logic of the disclosed embodiments as embodied in computer program software. Those skilled in the art will appreciate that the flow charts illustrate the structures of logic elements, such as computer program code elements or electronic logic circuits, that function according to the disclosed embodiments. Manifestly, the disclosed embodiments are practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by processors within the above-described components as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

As shown in FIG. 2, commencing at step 26, communication using an appropriate over-the-air (OTA) protocol is established between the MS 12 and the CAP 16, i.e., between the MS 12 and the virtual IP endpoint of the present invention. In one exemplary, non-limiting embodiment, the process at step 26 can include receiving a CDMA protocol origination message from the MS 12 in, for example, IS-95 protocol, and then in response essentially transforming the origination message to IP by sending an IP-based Session Initiation Protocol (SIP) message from the CAP 16 to the SIP server 18 at block 28.

Specifically, CDMA-specific call set-up parameters including authentication parameters are encapsulated in the SIP message by the CAP 16. In one non-limiting embodiment the SIP message is an SIP Register message, and the CDMA authentication parameters can include but are not limited to RANDC, AUTHR, and COUNT. The header of the SIP message indicates that the body of the message contains the CDMA parameters. In one non-limiting aspect, the header defines a new media type or CDMA function that indicates the CDMA-specific data in the message body. The CDMA function can be defined as a service that can be invited to SIP sessions. An agent can be associated with the service and be invoked when invited to an SIP session.

An illustrative, non-limiting example of an SIP message incorporating the principles set forth above is:

REGISTER sip:registrar@qc-pbx.com SIP/2.0
Via: SIP/2.0/UDP 10.11.12.12:5060
To: 8586512442<sip:8586512442@CAP.qc-pbx.com>
From: 8586512442<sip:8586512442@CAP.qc-pbx.com>
Call-ID: 12@10.11.12.13
Cseq: 1 REGISTER
Contact: sip:8586512442@CAP.qc-pbx.com
Proxy-Authorization: CDMA-IS41
   RANDC: XXXX
   AUTHR: XXXX
   COUNT: XXXX Moving to block 30, the SIP server 18 sends the SIP message and/or a location query to the database 20 to ascertain the location and/or IP address of the called party. In one non-limiting illustrative embodiment, an IP address that has been allocated to the receiving virtual IP endpoint (e.g., to the CAP closest to the called party, when the called party is another MS) is associated with the called party. This address is recorded in the infrastructure 14 in, e.g., table lookup form, as being the address of the called party. By "IP address" is meant an address useful in identifying intended recipients of IP packets. This can include a conventional IP address numeric string and/or an alpha-numeric address associated with the string. In one non-limiting example, the alpha-numeric address can be the telephone number of the called party with an IP identifier appended thereto, e.g., 5551212@qualcomm.com. More generally, the IP address can include a wireless device identification such as an electronic serial number.

In any case, the SIP server 18 and/or database 20 sends the SIP message to the IS41 gateway 22 at block 32. At block 34, the IS41 gateway strips away or otherwise accesses the CDMA-specific parameters including authentication parameters from the SIP message by reading the header of the message and thereby ascertaining that the parameters exist in the message.

Proceeding to block 36, the IS41 gateway 22 sends an IS41 protocol message over, e.g., an SS7 carrier to an authorization entity in the external network 24 or resident in the IS41 gateway 22. The IS41 message includes OTA parameters, e.g., the CDMA-specific call set-up parameters. Using the parameters the authorization entity grants (or not) authorization for the call. If authorization is not granted at decision diamond 38, the call set-up ends at state 40; otherwise, authorization granting parameters are sent to the IS41 gateway 22 at block 42, encapsulated in IS41/SS7.

At block 44 the IS41 gateway transforms the IS41 protocol data into IP by, e.g., encapsulating CDMA information in an SIP message. The SIP message is sent to the database 20 and/or SIP server 18. Moving to block 46, the database 20 sends to the SIP server 18 a message acknowledging the query at block 30, such as but not limited to a location response message, and then, at block 48, the SIP server 18 responds to the CAP 16 message of block 28 by, e.g., sending an SIP "authorization granted" message to the CAP 16. The CAP 16 then sends OTA parameters, e.g., in an IS-95 message, to the MS 12, indicating that the registration request has been granted and that connectivity exists with the called party.

In addition to encapsulating the call set-up parameters in SIP messages, the CAP 16 then transforms subsequent OTA packets such as OTA voice packets from the MS 12 to IP. To make this transformation, the contents of the OTA voice packets are rearranged as appropriate to conform to IP packet requirements, and then addressed to the IP address of the recipient. Typically, since OTA voice packets are smaller than IP packets and frequently are smaller than the headers of IP packets, several OTA packets might be combined into a single IP packet, although this might not necessarily be the case particularly for latency intensive applications. The information in IP, which can represent voice, digital data, digitized image data, or other type of data is sent through the infrastructure 14 toward the recipient.

Likewise, IP packets representing information that originated at the recipient device move through the infrastructure 14 and are converted to OTA packets by the CAP 16. The OTA packets are sent to the MS 12. The transformation from IP to OTA protocol is the reverse of the process for converting OTA packets to IP packets, i.e., each IP packet might be separated into a set of smaller OTA packets as appropriate to conform to the OTA protocol used by the MS 12.

While the above disclosure focusses on a call set-up sequence, the principles advanced herein apply to the general situation wherein IP is transmitted between a CAP and an IS41 gateway, with the CAP executing OTA-to-IP translation and vice-versa and the IS41 gateway executing IS41-to-IP translation and vice-versa.

While the particular SYSTEM AND METHOD FOR MOBILE STATION AUTHENTICATION USING SESSION INITIATION PROTOCOL (SIP) as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A voice over Internet (VOIP) system, comprising:
   at least one access point communicating with one or more mobile stations (MS) using a wireless device over-the-air protocol different from Internet protocol (IP), the access point including:
   a first logic component configured for transforming information from an MS in wireless device protocol to IP protocol, the first logic component configured for encapsulating authentication parameters in IP;

a second logic component configured for sending a message containing the information in IP toward a gateway configured for stripping the authentication parameters therefrom; and a third logic component for defining a header indicating the presence of the authentication parameters in the message and a media type corresponding to the authentication parameters.

2. A voice over Internet (VOIP) system, comprising: at least one access point communicating with one or more mobile stations (MS) using a wireless device over-the-air protocol different from Internet protocol (IP), the access point including at least one logic component configured for transforming information from an MS in wireless device protocol to IP protocol, the logic component configured for encapsulating authentication parameters in IP and sending the information in IP toward a gateway configured for stripping the authentication parameters therefrom, wherein the access point generates a session initiation protocol (SIP) message containing a header indicating the presence of the message and a media type corresponding to the authentication parameters in the message.

3. The system of claim 2, wherein the access point is a base station.

4. The system of claim 2, wherein the logic component converts over the air (OTA) protocol packets to IP packets.

5. The system of claim 2, wherein the SIP message is an SIP Register message.

6. The system of claim 2, wherein the authentication parameters include at least one of: RANDC, AUTHR, and COUNT.

7. The system of claim 2, wherein the header includes at least one function defined as a service that can be invited to SIP sessions.

8. The system of claim 7, wherein the service includes an SIP agent.

9. A voice over Internet (VOIP) system, comprising:
at least one access point communicating with one or more mobile stations (MS) using a wireless device over-the-air protocol different from Internet protocol (IP), the access point including at least one logic component configured for transforming information from an MS in wireless device protocol to IP protocol, the logic component configured for encapsulating authentication parameters in IP, including a header indicating the presence of the authentication parameters in the IP and a media type corresponding to the authentication parameters in the IP, and sending the information in IP toward a gateway configured for stripping the authentication parameters therefrom; and at least one gateway receiving IP from the access point and stripping the authentication parameters therefrom, the gateway sending the authentication parameters to an authenticating entity in a format other than IP.

10. The system of claim 9, wherein the authenticating entity is part of a network.

11. A method for communicating information in Internet protocol (IP) to a wireless device not supporting IP, comprising:
encapsulating call set-up parameters in at least one session initiation protocol (SIP) message;
including in the SIP message a header indicating the presence of the message and a media type corresponding to the call set-up parameters in the SIP message;
transmitting the SIP message through an IP infrastructure;
receiving the SIP message; and stripping the call set-up parameters from the SIP message for use in establishing communication between a mobile station (MS) and a called party.

12. The method of claim 11, further comprising sending the call set-up parameters in IS41 protocol to an authenticating entity after the stripping act.

13. The method of claim 11, comprising converting over the air (OTA) protocol packets to IP packets.

14. The method of claim 13, comprising converting IP packets to over the air (OTA) protocol packets.

15. The method of claim 11, wherein the SIP message is an SIP Register message.

16. The method of claim 11, wherein the message includes a header including at least one function defined as a service that can be invited to SIP sessions.

17. The method of claim 16, wherein the service includes an SIP agent.

18. A communication system, comprising:
an IP-based infrastructure transmitting information relating to wireless voice transmissions in session initiation protocol (SIP) messages, at least some of the information including non-IP authentication data encapsulated in IP, the message further including a header indicating the presence of the message and a media type corresponding to the authentication data in the message; and at least one IS41 gateway receiving the SIP messages, stripping the information, and transmitting the authentication data using a protocol different from IP.

19. A communication system, comprising:
an IP-based infrastructure transmitting information relating to wireless voice transmissions, at least some of the information including non-IP authentication data encapsulated in IP; and at least one gateway receiving the information and transmitting the authentication data using a protocol different from IP, wherein the authentication data is encapsulated in session initiation protocol (SIP) messages, each message including a header, indicating the presence of the authentication data in the message and a data type corresponding to authentication data.

20. The system of claim 19, the protocol different from IP is IS41.

21. The system of claim 19, further comprising:
at least one access point communicating with one or more mobile stations (MS) using a wireless device over-the-air protocol different from Internet protocol (IP), the access point including:
at least one logic component transforming information in wireless device protocol from an MS to IP protocol, the logic component encapsulating authentication data in IP and sending the information in IP toward the gateway.

22. The system of claim 21, wherein the access point is a base station.

23. The system of claim 21, wherein the logic component converts over the air (OTA) protocol packets to IP packets.

24. The system of claim 23, wherein the logic component converts IP packets to over the air (OTA) protocol packets.

25. The system of claim 19, wherein the SIP message is an SIP Register message.

26. The system of claim 19, wherein the header includes at least one function defined as a service that can be invited to SIP sessions.

27. The system of claim 26, wherein the service includes an SIP agent.

28. A communication system, comprising:

an IP-based infrastructure transmitting information relating to wireless voice transmissions, at least some of the information including non-IP authentication data encapsulated in IP, the message further including a header indicating the presence of the message and a media type corresponding to the authentication data in the message; and at least one gateway receiving the information and transmitting the authentication data using a protocol different from IP wherein the authentication data includes at least one of: RANDC, AUTHR, and COUNT.

29. A session initiation protocol (SIP) message structure for implementing voice over Internet (VOIP) communication in a communication system, the message structure comprising:

at least one message body containing non-IP authentication parameters; and at least one header defining a media type corresponding to the CDMA authentication parameters and indicating the presence of the authentication parameters in the message.

30. The SIP message structure of claim 29, wherein the message structure establishes a SIP Register message.

31. The SIP message structure of claim 29, wherein the authentication parameters include at least one of: RANDC, AUTHR, and COUNT.

32. The SIP message structure of claim 29, wherein the header includes at least one function defined as a service that can be invited to SIP sessions.

33. The SIP message structure of claim 32, wherein the service includes an SIP agent.

34. A system for communicating information in Internet protocol (IP) to a wireless device not supporting IP, comprising:

means for encapsulating call set-up parameters in at least one session initiation protocol (SIP) message;

means for including in the SIP message a header indicating the presence of the message and a media type corresponding to the call set-up parameters in the SIP message;

means for transmitting the SIP message through an IP infrastructure;

means for receiving the SIP message; and means for stripping the call set-up parameters from the SIP message for use in establishing communication between a mobile station (MS) and a called party.

35. The system of claim 34, further comprising means for sending the call set-up parameters in IS41 protocol to an authenticating entity.

36. The system of claim 34, comprising means for converting over the air (OTA) protocol packets to IP packets.

37. The system of claim 36, comprising means for converting IP packets to over the air (OTA) protocol packets.

38. The system of claim 34, wherein the SIP message is an SIP Register message.

39. The system of claim 34, wherein the parameters include at least one of: RANDC, AUTHR, and COUNT.

40. An IS-41 gateway, comprising:

means for receiving session initiation protocol (SIP) messages, at least some of which encapsulate authentication parameters and a header indicating the presence of the authentication parameters in the message and a media type corresponding to the authentication parameters;

means for stripping the authentication parameters from the SIP messages; and means for sending the parameters in IS-41 protocol toward an authenticating entity.

41. A method for communicating information in Internet protocol (IP) from a wireless device not supporting IP, comprising:

encapsulating call set-up parameters in at least one session initiation protocol (SIP) message;

including in the SIP message a header indicating the presence of the message and a media type corresponding to the call set-up parameters in the SIP message; and transmitting the SIP message through an IP infrastructure to a gateway configured for stripping the call set-up parameters from the SIP message for use in establishing communication between a mobile station (MS) and a called party.

42. A method for communicating information in Internet protocol (IP) with a wireless device not supporting IP, comprising:

receiving at least one session initiation protocol (SIP) message encapsulating call set-up parameters a header indicating the presence of the authentication parameters in the message and a media type corresponding to the authentication parameters; and stripping the call set-up parameters from the SIP message for use in establishing communication between a mobile station (MS) and a called party.

* * * * *